United States Patent [19]
Reid

[11] 3,764,010
[45] Oct. 9, 1973

[54] APPARATUS AND METHOD FOR CLEANING WASTE DISPOSAL SYSTEMS

[75] Inventor: James S. Reid, Hudson, Ohio

[73] Assignee: The Standard Products Company, Cleveland, Ohio

[22] Filed: Oct. 15, 1970

[21] Appl. No.: 80,982

[52] U.S. Cl................. 210/149, 210/152, 210/181
[51] Int. Cl............................................ B01d 21/24
[58] Field of Search....................... 134/19, 16–17; 210/71, 181; 4/8, 131

[56] References Cited
UNITED STATES PATENTS

| | | | |
|---|---|---|---|
| 2,678,450 | 5/1954 | Simpson et al. | 4/131 X |
| 2,768,386 | 10/1956 | Graef et al. | 4/131 |
| R26,891 | 5/1970 | Reid | 210/152 |
| 2,600,820 | 6/1952 | Whatley | 134/17 |
| 2,938,630 | 5/1960 | Novak | 210/181 X |
| 2,998,139 | 8/1961 | Novak | 210/71 X |
| 1,191,451 | 7/1916 | Morterud | 134/17 |
| 2,254,980 | 9/1941 | Simmons | 134/17 |
| 3,615,010 | 10/1971 | Reid et al. | 210/152 X |
| 3,633,746 | 1/1972 | Dieterich | 210/152 X |
| 3,635,276 | 1/1972 | Green et al. | 210/152 X |

Primary Examiner—John Adee
Attorney—Meyer, Tilberry & Body

[57] ABSTRACT

A waste disposal system of the type including vaporizing means and feed means for feeding liquid and organic waste material to the vaporizing means is provided with means for stopping operation of the feed means while supplying heat to the vaporizing means to raise its temperature substantially above the boiling point of water. The feed means is then started to supply liquid to the vaporizing means whereby the liquid flashes into steam substantially instantaneously and breaks caked deposits from the walls of the vaporizing means.

3 Claims, 5 Drawing Figures

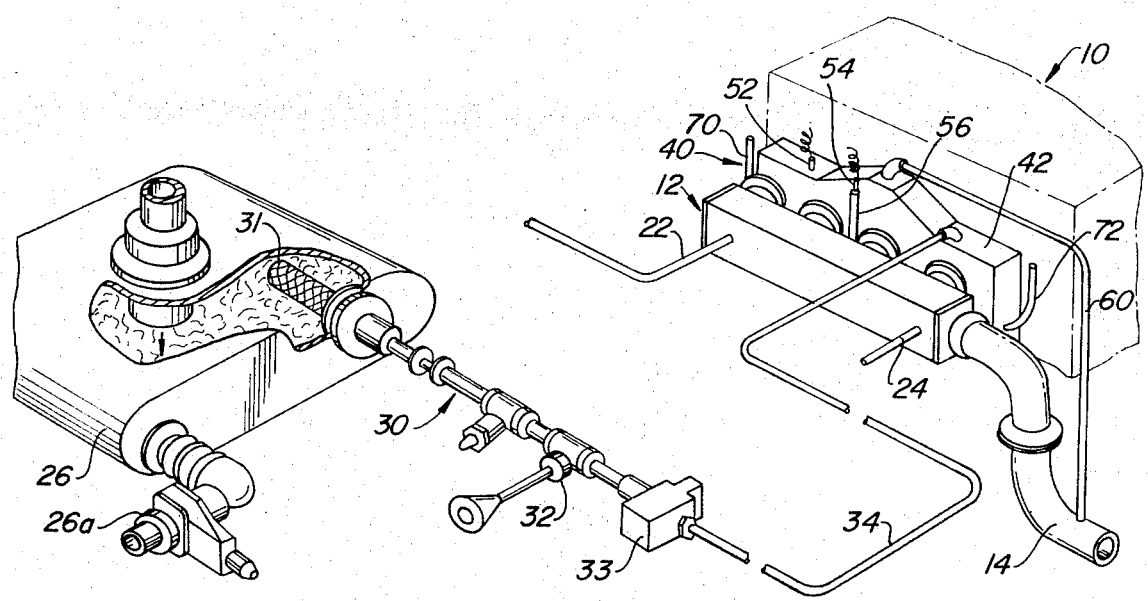
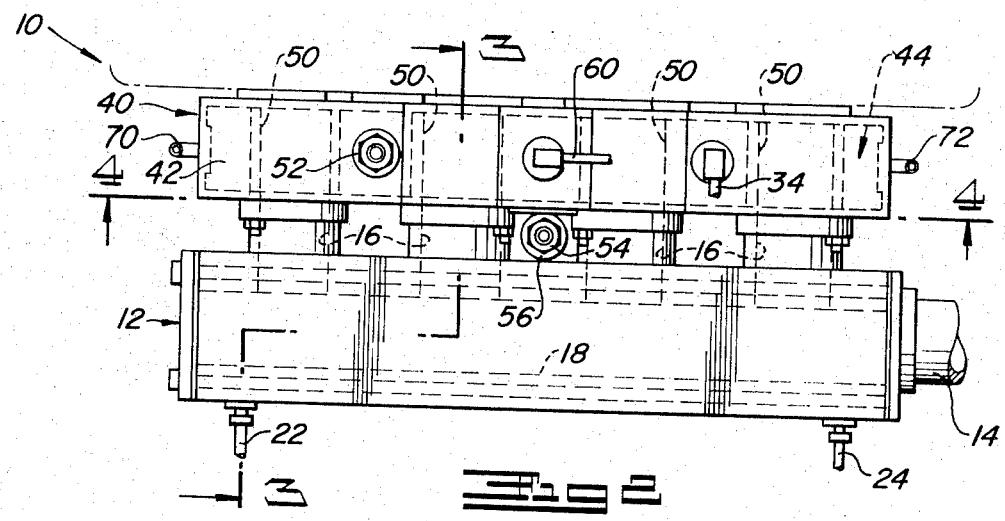
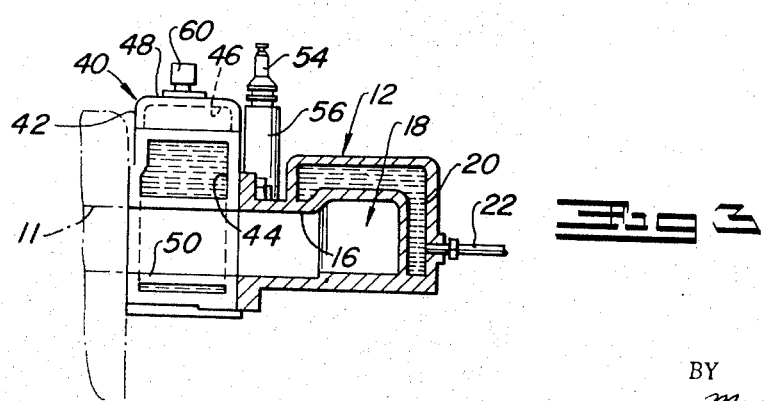
INVENTOR.
JAMES S. REID
BY
Meyer, Tilberry & Body
ATTORNEYS

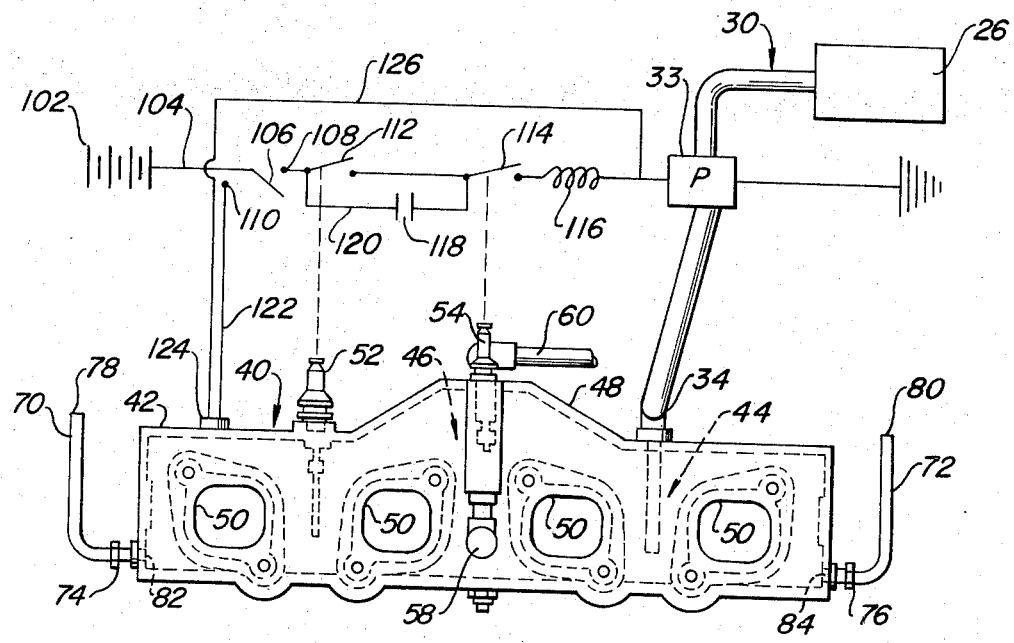

APPARATUS AND METHOD FOR CLEANING WASTE DISPOSAL SYSTEMS

BACKGROUND OF THE INVENTION

This application pertains to the art of waste disposal and more particularly to cleaning of waste disposal systems. The invention is particularly applicable to waste disposal systems which are used on human conveyances and will be described with particular reference thereto although it will be appreciated that the invention has broader applications and can be used in other environments.

Waste disposal systems of a known type for use on human conveyances include a vaporizing means and feed means for feeding liquid and organic waste material to the vaporizing means. One known system of this type is that described in U.S. Pat. Re. No. 26,891, issued May 26, 1970. In a system of this type, liquid and organic waste material is collected in a waste tank. A vaporizing means in the form of a boiler utilizes waste heat from a fuel burning engine on the conveyance. A conduit connects the waste tank with the boiler and a pump defines a feed means for feeding the liquid and organic waste material from the waste tank to the boiler. The heated boiler vaporizes the liquid waste material and the vaporized effluent is exhausted from the boiler either to atmosphere or to the exhaust pipe for the fuel burning engine. In such systems, minerals in the liquid, and organic solids, eventually form a caked deposit on the internal walls of the boiler. Such caked deposits also form on the pipe which transfers heat from the fuel burning engine to the boiler. These deposits act as a heat insulator and greatly reduce the efficiency of heat transfer to the boiler so that it is not capable of operating at optimum efficiency and may be incapable of vaporizing waste material at the necessary rate. Eventually, the caked deposit may also reduce the volume of the boiler so that it is not capable of disposing of waste material at the necessary rate for which it was originally designed.

SUMMARY OF THE INVENTION

A waste disposal system of the type described is provided with means for removing the caked deposits from the walls of the boiler without having to disassemble the boiler and manually break the deposit away.

In accordance with one arrangement, a control means is provided for stopping operation of the feed means so that the boiler will run dry. Heat is then supplied to the boiler while it is dry so that its temperature is raised substantially above the boiling point of water. With the boiler at this high temperature, the feed means is started to supply liquid to the boiler. With the boiler at this high temperature, the liquid flashes into steam substantially instantaneously and breaks the caked deposits from the walls of the boiler. These deposits are then swept from the boiler through the normal exhaust outlet.

It is a principal object of the present invention to provide an improved apparatus and method for cleaning caked scale or deposits from the walls of a vaporizing unit in a waste disposal system.

It is another object of the invention to provide an improved arrangement for cleaning a vaporizing unit in a waste disposal system without requiring disassembly of the vaporizing unit or any manual scraping.

It is also an object of the present invention to provide such an improved cleaning arrangement which is very economical to manufacture and very simple in operation.

It is a further object of the present invention to provide an improved arrangement for cleaning a vaporizing unit in a waste disposal system by utilizing energy released by substantially instantaneous conversion of liquid into steam.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a schematic perspective illustration of a waste disposal system having the improvement of the present invention incorporated therein;

FIG. 2 is a top plan view of the waste disposal system of FIG. 1;

FIG. 3 is a cross-sectional elevational view looking in the direction of arrows 3—3 of FIG. 2;

FIG. 4 is a side elevational view looking in the direction of arrows 4—4 of FIG. 2; and FIG. 5 is a side elevational view of an exhaust conduit and connection with the outlet from the boiler unit of FIGS. 1-4.

DESCRIPTION OF THE PREFERRED EMBODIMENT

Referring now to the drawings, wherein the showings are for purposes of illustrating a preferred embodiment of the invention only and not for purposes of limiting same, FIG. 1 shows a waste disposal system of the type in which the present invention is installed. The system is illustrated as adapted for use with a source of power such as a fuel burning engine schematically illustrated at 10. Engine 10 may be of any conventional construction and may be a marine engine or other type of engine suitable for powering a human conveyance. It will be recognized that the present invention is usable with waste disposal systems installed on airplanes, boats, buses and camping trailers, and is also usable in fixed installations where exhaust heat from a fuel burning electric generator engine is utilized. It will also be recognized that other heat sources may be utilized in replacement of, or supplemental to, the waste heat from a fuel burning engine. Typically, a marine engine includes an exhaust manifold 12 which is normally secured directly to the block of the engine and to which one end of an exhaust pipe 14 is connected. As is conventional, the exhaust manifold 12 includes a plurality of exhaust ports 16 formed in one wall of the manifold with the ports being in communication with the exhaust ports 11 in the block leading from the cylinder chambers. The products of combustion in the engine are discharged into exhaust manifold chamber 18 and then through exhaust pipe 14 to atmosphere. A cooling jacket 20 normally surrounds at least a portion of the manifold chamber 18 and cooling water is circulated through jacket 20 by an inlet tube 22 and an outlet tube 24.

It will be appreciated that in engines such as a V-8 engine in which there are two banks of cylinders, two exhaust manifolds will be provided with one manifold on either side of the engine block.

As stated, the hot exhaust gases which normally emerge from engine 10 pass through exhaust ports 16 into manifold chamber 18 and then to exhaust pipe 14 where the gases are discharged to atmosphere. These exhaust gases are normally at very high temperatures as they emerge from engine 10 and it is these gases which are utilized to vaporize the liquid waste material in a waste disposal system of the type described.

The waste disposal system includes a conventional source of waste products such as a water closet, sink or shower, all of which are a source of liquid and organic waste products which must be disposed of in a sanitary fashion. Typically, the disposal of such waste products has been accomplished through the use of a septic tank 26 which is conveniently located, in the case of a vehicle, in a place readily available for cleaning, maintenance and the like. A drain 26a may be provided on the waste tank, preferably adjacent to the bottom thereof, to facilitate cleaning of the tank.

Tank 26 is connected to the source of waste products and is constructed to function as a conventional septic tank whereby, in a manner well known, solid organic materials are digestively attacked by anaerobic organisms and are thereby converted into a partially purified solution. An outlet conduit assembly, indicated generally by the reference numeral 30, is connected at one end to waste tank 26 and includes a suitable filter 31 which is located inside the tank. Filter 31 is located at a liquid level wherein a substantially complete anaerobic process may be performed on the solid waste materials and also functions to prevent the escape of any large solid organic material from tank 26. The outlet conduit assembly may also include a suitable shut-off valve 32 and an electric inline liquid metering pump 33 of suitable construction.

Connected to the discharge port of pump 33 is a line 34 which connects the pump with a boiler unit or vaporizing means indicated generally by reference numeral 40. Boiler unit 40 comprises a housing 42 which is preferably formed of cast iron for use with the present invention. It will be recognized that other materials may also be suitable. Housing 42 may be made up either as a single integral unit or may be comprised of a plurality of sectional units which form a complete unit when assembled. Housing 42 includes a fluid chamber 44 in the interior thereof and a steam chamber 46 which is defined by a raised portion 48 of housing 42. Housing 42 further includes a plurality of passages 50 which extend transversely through the housing. Passages 50 are equal in number and size to the exhaust ports of the engine with which the boiler unit is to be employed. Thus, if the unit is to be used with a V-8 engine, a pair of boiler units 40 will be used, with each unit including four passages 50 which are adapted to cooperate with the exhaust ports associated with each bank of cylinders.

Boiler unit 40 includes a pair of liquid level sensing electrodes or probes 52 and 54. Probe 52 extends into liquid chamber 44 to a depth adjacent the bottom of passages 50. Probe 54 is disposed in a probe housing 56 which is interconnected by conduit 58 with the liquid chamber in housing 42. The inner end of probe 54 is positioned at approximately the level of the juncture between liquid chamber 44 and steam chamber 46. Both of these probes are interconnected by appropriate electrical leads to the pump 33. Both probes are of the type commercially available from companies such as B. W. Controller Corporation, Birmingham, Michigan.

An outlet conduit 60 is in communication at one end with steam chamber 46 and at its other end with exhaust pipe 14. Boiler unit 40 is employed by assembling it between exhaust manifold 12 and the block of engine 10. This is illustrated in FIG. 4 wherein the boiler is secured to the block of the engine where the exhaust manifold is normally located, with exhaust manifold 12 being connected to the boiler instead of directly to the block. As is apparent from FIG. 4, passages 50 in boiler 40 are aligned with exhaust ports 11 in the block, and with exhaust ports 16 leading into exhaust chamber 18 in manifold 12. In this manner, the hot exhaust gases passing from the engine cylinders are discharged directly into passages 50 in boiler 40 and subsequently into the exhaust manifold where they are discharged to the exhaust pipe.

The above described waste disposal system operates in the following manner. Waste material is deposited in waste tank 26 where it is converted into a partially purified solution. When the level of liquid waste in the tank has risen to the level of filter 31, and it is desired to dispose of this liquid material, the fluid is pumped by pump 33 through line 34 to boiler unit 40 where it is deposited in fluid chamber 44. The operation of pump 33 is controlled by probes 52 and 54. Pump 33 will be actuated when the level of liquid in fluid chamber 44 is below the end of probe 52 and operation of pump 33 will be discontinued when the level of liquid in fluid chamber 44 reaches the end of probe 54. In this manner, flooding of boiler unit 44 is prevented.

With engine 10 running, the hot exhaust gases are discharged directly into passages 50. Because of the elevated temperature of these exhaust gases, the boiler unit and the liquid disposed therein is raised to a temperature where the liquid commences to vaporize, with the vapors collecting in steam chamber 46. As the liquid is vaporized, the liquid level in the fluid chamber 44 decreases until it reaches a level where probe 52 again actuates pump 33 and the liquid level is brought back up to the level governed by probe 54. Meanwhile, the vapors collecting in steam chamber 46 pass out of boiler unit 40 through discharge line 60 and are then discharged into exhaust pipe 14 where they are mixed with the exhaust gases and discharged into the atmosphere. Some of the vapors in tube 60 may become cooled and revert partially or substantially to a liquid form prior to being discharged into exhaust pipe 14; however, since both the vapors and the condensed liquid in tube 60 have been subjected to the elevated temperatures present in steam chamber 46, they are in a purified condition so that the resultant gas or liquid discharged from the exhaust pipe do not create any health hazards.

In accordance with another aspect of the system, means is provided for feeding air to the vaporizing means defined by boiler unit 40. In accordance with one arrangement, as shown in FIG. 5, conduits 70 and 72 are connected to boiler unit 40 by suitable fittings 74 and 76. Conduits 70 and 72 have open inlet ends 78 and 80 which are open to atmosphere and positioned at least above chamber 44. Conduits 70 and 72 have outlets 82 and 84 opening into chamber 44. With the arrangement of FIG. 5, outlet conduit 60 from boiler unit 40 is connected by a suitable fitting 86 to a venturi nozzle 88 which in turn is connected to exhaust conduit 14 by a suitable fitting 90. As shown in FIG. 5, exhaust conduit 14 includes a smoothly curved reduced diameter internal portion 92 within which nozzle end 94 of venturi 88 is positioned. When the level of liquid waste in chamber 44 falls below openings 82 and 84 to conduits 70 and 72, exhaust flowing through reduced diameter portion 92 of exhaust conduit 42 draws a vacuum through venturi 88 and line 60 so that air is drawn into chamber 44 through conduits 70 and 72. Such air sweeps through chamber 44 and is drawn through outlet conduit 60 to exhaust conduit 14. This flow of ambient air through conduit 70 and 72 into chamber 44 prevents the temperature of boiler unit 40 from becoming too high when there is no liquid waste in chamber 44. In addition, solid organic material which is deposited on the interior of boiler unit 40 upon complete vaporization of all of the liquid waste will be burned and consumed by the excess free oxygen provided through conduit 70 and 72. When a closed boiler unit is used, solid organic material is not completely burned and consumed because there is no oxygen present within the boiler unit.

It will be recognized that the present invention may also be used to clean a waste disposal system boiler which does not have air inlet conduits 70 and 72. In such a system, organic solids will not be burned and will build up at a faster rate on the internal walls of the boiler. In a system which is provided with air inlet conduits 70 and 72, organic solids are burned to leave only an ash residue which builds up on the internal walls of the boiler at a much slower rate. This build up of ash, and minerals from evaporated liquid, coats the internal walls of boiler 40 and the surfaces of passages 50 to reduce the heat transfer efficiency of the boiler.

Although other types of engines may be used, one example will be given with regard to a spark ignition internal combustion engine. Such an engine commonly develops temperatures of 5,000° – 6,000° F. in the cylinders when combustion occurs. Although the engine is provided with a cooling arrangement, the exhaust gases may be at a temperature of 1,000° – 1,500° F. immediately upon exit from exhaust port 11 of engine 10. Boiler 40 will radiate some of this heat, but the gases are still hot enough to heat boiler 40 to a temperature of around 1,000° F. when boiler 40 is dry. If desired, it is possible to provide heat radiating fins on boiler unit 40 to prevent its temperature from reaching anything greater than around 700° F. With the arrangement shown, conduits 70 and 72 are preferably provided with inlets 78 and 80 which will not admit sufficient air to cool boiler 40 below around 700° F. That is, normal operation of engine 10 will not aspirate sufficient air through conduits 70 and 72 by means of venturi 88 to cool boiler 40 below around 700° F. when boiler 40 is dry. In a preferred arrangement, the temperature of boiler 40 is not allowed to drop below around 500° F. when it is dry.

In accordance with a preferred arrangement, pump 33 is connected with the electrical system of the human conveyance on which the waste disposal system is installed. One control arrangement is diagrammatically illustrated in FIG. 4. Battery 102 is connected through line 104 with switch 106 which is shown in its open position. Switch 106 may be thrown to close with contact 108 or contact 110. Probes 52 and 54 have switches 112 and 114 respectively. Switches 112 and 114 are normally closed when there is no liquid contacting probes 52 and 54. Solenoid 116 of a relay switch is in series with switches 112 and 114, and the relay switch has a normally open contact 118 in a holding circuit 120 in parallel with switch 112. In normal operation, boiler unit 40 will be dry. Switch 106 may then be thrown to close with contact 108 for normal operation of the waste disposal system. Pump 33 is then energized through switches 112 and 114 to pump waste material from waste tank 26 into chamber 44 of boiler 40. When liquid touches probe 52, switch 112 will open. However, normally open contact 118 will have been closed so that pump 33 continues operating through holding circuit 120 and switch 114. When liquid touches probe 54, switch 114 will open and solenoid 116 of the relay switch will be de-energized so that contact 118 will open. Pump 33 is then de-energized. As the liquid in chamber 44 is vaporized, switch 114 will again close. However, pump 33 cannot be energized because switch 112 and contact 118 remain open. Switch 112 will not close again to energize pump 33 until the liquid in chamber 44 has dropped below probe 52.

In order to clean boiler 40, master switch 106 is thrown to close with contact 110. Switch 106 is then connected in series through line 122 with thermocouple 124. Thermocouple 124 is also connected through line 126 with pump 33. Thermocouple 124 is designed to close only when the temperature of boiler 40 has reached at least 500° F. Therefore, when boiler 40 is below a temperature of 500° F., thermocouple 124 remains open and pump 33 does not operate. Any liquid remaining in boiler 40 will soon be vaporized and boiler 40 will be dry. The temperature of boiler 40 will then begin to rise substantially above the boiling point of water as it is supplied with heat from exhaust ports 11 of engine 10. Once boiler 40 has reached a temperature of at least 500° F., thermocouple 124 will close to connect pump 33 with battery 102. Pump 33 will then begin operating to pump liquid and organic waste material from waste tank 26 to chamber 44 of boiler 40. Liquid entering chamber 44 at the elevated temperature of boiler 40 flashes into steam substantially instantaneously. The liquid will expand to 1,600 times its original volume substantially instantaneously and this causes somewhat of an explosion and the shock wave will cause boiler 40 to reverberate. In addition, the steam particles will move at an extremely rapid velocity and impact against the internal walls of boiler 40. The reverberation and the impact of steam particles with the internal walls of boiler 40 will cause caked deposits of minerals and organic material to break loose from the internal walls of boiler 40. The particles which break loose will be swept in the high velocity flow of steam out of conduit 60 into exhaust pipe 14. With the arrangement shown, the action of venturi 88 drawing air through conduits 70 and 72 will also sweep such particles from boiler 40. Nozzle 94 of venturi 88 is preferably large enough to allow solid particles to pass easily therethrough. It will be recognized that it is not essential to have a venturi nozzle for drawing material from boiler unit 40. Conduit 60 may simply be connected with exhaust conduit 14 or may be open to atmosphere. The turbulence created within chamber 44 of boiler 40 by the high temperature steam will be sufficient to carry solid particles out conduit 60 with the high velocity flow of high temperature steam. When pump 33 begins operating to inject liquid and organic waste material into boiler 40, the temperature of boiler 40 will rapidly drop below 500° F. so that thermocouple 124 will open to de-energize pump 33. This arrangement provides a momentary pulsing of pump 33 to feed a small charge of liquid into boiler 40. As long as switch 106 remains closed with contact 110 there will be a repetitive pulsing of pump 33 as the temperature of boiler 40 goes above 500° F. and falls below 500° F. to cause alternate closing and opening of thermocouple 124. The operator of the conveyance will normally hear the explosion when liquid is injected into boiler 40 at the high temperature. The operator may leave switch 106 closed with contact 110 until he has heard several explosions to assure thorough cleaning of caked deposits from the internal walls of boiler 40. The operator may then throw switch 106 to its open position or may return it to its normal operating position by closing it with contact 108.

It will be recognized that cast iron is a preferred material for boiler 40 because it is capable of withstanding the high temperatures as well as the severe expansion and contraction caused by the rapid change in temperature. Cast iron is also well suited because it is capable of withstanding the reverberations occurring when the cleaning system is operated.

While a preferred embodiment of the present invention has been described in the foregoing specification and shown in the accompanying drawing, obvious alterations and modifications will be readily apparent to those skilled in the art upon a reading and understanding of the specification. The present invention covers all such obvious alterations and modifications, and is limited only by the scope of the claims.

I claim:

1. In a waste disposal system including vaporizing means and feed means for feeding liquid and organic human bacteriological waste material to said vaporizing means, heating means for heating said vaporizing means, control means selectively movable between on and off positions for selectively starting and stopping operation of said feed means, said vaporizing means operating at normal operating temperature to vaporize said waste material with said control means in said on position, the improvement comprising; a clean out circuit for controlling operation of said feed means to clean caked deposits from said vaporizing means, said clean out circuit including a normally open temperature responsive switch positioned in heat transfer relationship with said vaporizing means and being movable to a closed position in response to a high temperature substantially greater than said normal operating temperature, said control means further including a clean out position for connecting said feed means in said clean out circuit, said clean out circuit being operative in said clean out position of said control means to stop operation of said feed means while said heating means continues to supply heat to said vaporizing means so that said vaporizing means becomes dry and reaches a high temperature substantially greater than said normal operating temperature, said temperature responsive switch being responsive to said high temperature to close and start said feed means for supplying a charge of said waste material to said vaporizing means whereby said waste material flashes into steam substantially instantaneously and breaks caked deposits from said vaporizing means.

2. The device of claim 1 wherein said vaporizing means is positioned adjacent exhaust port means of a fuel burning engine which discharges waste heat through said exhaust port means, said heating means being defined by said engine.

3. An improved waste disposal system for use with a power source such as an internal combustion engine or the like in which waste heated gases are generated and which includes an exhaust system comprising exhaust ports, an exhaust manifold and an exhaust pipe for disposing of said heated gases, said disposal system including a waste tank for receiving waste material and means for vaporizing the liquid material, conduit means connecting said vaporizing means to said tank to receive liquid therefrom and to said exhaust system to discharge vapor thereinto, said vaporizing means being positioned between said engine and said manifold and exposed to the heated gases as the gases pass from the exhaust ports of the engine to the exhaust manifold, pump means for supplying waste material to said vaporizing means from said waste tank, control means selectively movable between on and off positions for selectively starting and stopping operation of said feed means, a clean out circuit for controlling operation of said feed means to clean caked deposits from said vaporizing means, said clean out circuit including a normally open temperature responsive switch positioned in heat transfer relationship with said vaporizing means and being movable to a closed position in response to a high temperature substantially greater than said normal operating temperature, said control means further including a clean out position for connecting said feed means in said clean out circuit, said clean out circuit being operative in said clean out position of said control means to stop operation of said feed means while said heating means continues to supply heat to said vaporizing means so that said vaporizing means becomes dry and reaches a high temperature substantially greater than said normal operating temperature, said temperature responsive switch being responsive to said high temperature to close and start said feed means for supplying a charge of said waste material to said vaporizing means whereby said waste material flashes into steam substantially instantaneously and breaks caked deposits from said vaporizing means.

* * * * *